US 8,045,511 B2

(12) United States Patent
Ryu et al.

(10) Patent No.: US 8,045,511 B2
(45) Date of Patent: Oct. 25, 2011

(54) METHOD AND APPARATUS FOR COLLABORATIVE SENSING BASED ON AN ALLOWED ERROR RANGE OF A SENSOR IN A WIRELESS SENSOR NODE

(75) Inventors: Je-Hyok Ryu, Suwon-si (KR); Hyo-Hyun Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 204 days.

(21) Appl. No.: 12/617,393

(22) Filed: Nov. 12, 2009

(65) Prior Publication Data
US 2010/0118786 A1 May 13, 2010

(30) Foreign Application Priority Data
Nov. 11, 2008 (KR) .................. 10-2008-0111611

(51) Int. Cl.
*H04Q 7/00* (2006.01)
*H04Q 7/24* (2006.01)
*H04B 17/00* (2006.01)

(52) U.S. Cl. .................. 370/328; 370/338; 340/539.22; 375/260; 455/67.11

(58) Field of Classification Search .......... 370/252–338, 370/445–448; 340/3.1, 500, 539.22, 539.23, 340/539.26, 686.1, 870.11; 375/260–340; 455/67.11, 147, 450, 509, 452.2, 515
See application file for complete search history.

(56) References Cited

U.S. PATENT DOCUMENTS

| | | | |
|---|---|---|---|
| 7,937,167 B1 * | 5/2011 | Mesarina et al. .............. 700/78 |
| 2006/0197660 A1 * | 9/2006 | Luebke et al. ........... 340/539.26 |
| 2007/0180918 A1 * | 8/2007 | Bahr et al. .................... 73/760 |
| 2008/0068156 A1 * | 3/2008 | Shimokawa et al. .... 340/539.22 |
| 2010/0065471 A1 * | 3/2010 | Chabot et al. .................. 208/57 |
| 2010/0150122 A1 * | 6/2010 | Berger et al. ................ 370/338 |

* cited by examiner

*Primary Examiner* — Afsar M. Qureshi
(74) *Attorney, Agent, or Firm* — The Farrell Law Firm, P.C.

(57) ABSTRACT

A method and an apparatus for transmitting sensor data by using AER sensing and collaborative sensing in order to increase the energy efficiency in a wireless sensor network. The method includes calculating an AER for each of said at least one sensor using sensor data measured from said at least one sensor and sensor profile information corresponding to said at least one sensor, and determining sensor data to be transmitted to a higher node from among sensor data provided by the sensor module based on the AER.

24 Claims, 13 Drawing Sheets

METHOD AND APPARATUS FOR COLLABORATIVE SENSING BASED ON AN ALLOWED ERROR RANGE OF A SENSOR IN A WIRELESS SENSOR NODE

PRIORITY

This application claims priority under 35 §119(a) to an application filed in the Korean Industrial Property Office on Nov. 11, 2008 and assigned Serial No. 10-2008-0111611, the contents of which are incorporated herein by reference.

BACKGROUND OF THE INVENTION

1. Field of the Invention

The present invention relates generally to a method and an apparatus for increasing energy efficiency in a wireless sensor network, and more particularly to a method and an apparatus for transmitting sensor data using AER and collaborative sensing.

2. Description of the Related Art

Various developments in communication technology have resulted in an environment in which users can freely access a network regardless of location and without taking a computer or network into consideration. This is commonly referred to as a "ubiquitous" environment.

The core technology of a ubiquitous environment includes a wireless sensor network system. In a wireless sensor network system, a sensor node independently operates by detecting information including geographical, environmental, and social changes. The detected information data is transmitted to a sink node of the sensor network. In the wireless sensor network system, each sensor node performs a routing function for transmitting sensor data. Each sensor node performs a routing function because the energy consumption rule in a wireless communication requires consumption of energy two to four times as much as that of the distance that a signal is to be transmitted. Accordingly, when a sensor node is not adjacent to a sink node in the network route, rather than transmit the sensor data directly to the sink node, the sensor node can reduce energy consumption by indirectly transmitting sensor data to the sink node via an adjacent node or through multi-hop.

The basic structure of a wireless sensor network includes multiple sensor nodes, each having an independent sensing capability and a computing capability, which are interconnected through a communication network, wherein each node has its own local battery for supplying power to itself. However, the battery supplying the power to each node has a limited power in comparison with general commercial electricity and is thus very limited in the use of energy.

In order to overcome this problem, research has been conducted for reducing power consumption in all fields of the sensor network. The main stream of this research is to reduce the times of wireless communication or the quantity of wireless communication between nodes, in order to extend the survival time of the network.

FIG. 1A schematically illustrates a typical wireless network system in which a sensor node transmits data to a sink node and the sink node performs a sensor data operation. In contrast, FIG. 1B schematically illustrates a wireless network system improved for increasing the energy efficiency of a sensor network, in which data aggregation (in-network aggregation) is used for transmitting data from a sensor node to a sink node.

More specifically, the in-network aggregation technology as illustrated in FIG. 1B has been studied as a solution for reducing the existing transmission message communication. As an example of a trial for more efficiently reducing the energy consumption by the communication message, it is possible to apply a threshold that changes according to the location of a node, i.e., to apply a threshold that increases as a node to which data is to be transmitted becomes farther from a node at which the data is to be finally collected. It is possible to reduce the message quantity by preventing transmission of sensor data to a higher node under the threshold. Here, an average value and a standard derivation are obtained from sensor data collected during a predetermined time from a predetermined group of nodes, and the obtained average value and standard derivation are compared with those obtained for a previous time, such that a predetermined threshold is obtained. Thereafter, data is transmitted only when a result of the comparison exceeds a predetermined threshold.

However, the threshold reflects the distance from the sensor node to the sink node, and a long distance increases the number of messages necessary for transmission to the sink node, thereby increasing the energy consumption. Therefore, the threshold causes allocation of less sensor data to a node located far from a sink node than to a node located near the sink node. Although the threshold is determined to have an optimum value either by a user or according to applicability, there is no indication of a specific solution for dynamic control. Further, although the transmission technology described above utilizes a distance factor, which implies that the technology discriminates the sensor data from a distanced node, it is not preferable because occurrences of events at the sensor node have no relation with the distance to the sink node.

Therefore, there is still a need for another solution, which increases energy efficiency of a sensor node by transmitting sensor data based on a category capable of properly selecting sensor data transmitted to a sink node.

The problems of a wireless sensor network system as described above can be summarized into the following two subjects: (1) prolonging the life of a sensor node by reducing energy consumption of the sensor node as much as possible; and (2) achieving economic and efficient use of an entire wireless network system through uniform energy consumption by multiple sensor nodes.

SUMMARY OF THE INVENTION

Accordingly, the present invention has been designed to address at least the above-mentioned problems occurring in the prior art and present a new sensing scheme. An aspect of the present invention is to provide a sensing method and a sensing apparatus based on an allowed error range for extending the life of a sensor node by reducing the quantity of data transmitted to a higher node.

Another aspect of the present invention is to provide a method and an apparatus for collaborative sensing between nodes using an allowed error range-based sensing that improves energy efficiency of a wireless sensor network.

In accordance with an aspect of the present invention, a sensor node of a wireless sensor network is provided. The sensor node includes: a sensor module including at least one sensor, the sensor module outputting sensor data measured by said at least one sensor; and an Allowed Error Range (AER) sensing block for calculating an AER for each of said at least one sensor by using sensor data measured from said at least one sensor and sensor profile information corresponding to said at least one sensor, and determining sensor data to be transmitted to a higher node from among sensor data provided by the sensor module, based on the AER.

In accordance with another aspect of the present invention, a method is provided for transmitting sensor data by a sensor node including at least one sensor in a wireless sensor network. The method includes: calculating an AER for each of said at least one sensor by using sensor data measured from said at least one sensor and sensor profile information corresponding to said at least one sensor; and determining sensor data to be transmitted to a higher node from among sensor data provided by the sensor module, based on the AER.

In accordance with another aspect of the present invention, a sensor network is provided, which includes: multiple child nodes, each of which includes at least one sensor and transmits sensor data measured by said at least one sensor; and a parent node for receiving sensor data from the multiple child nodes. The parent node manages information on the multiple child nodes, determines a child node in a collaborative active state, to which sensor data measured by a same sensor from among child nodes having the same sensor will be transmitted, and a child node in a collaborative sleeping state, to which sensor data measured by the same sensor will not be transmitted, from child nodes having the same sensor by using the information on the multiple child nodes, and controls transmission of sensor data measured by the same sensor to each of the determined child nodes.

In accordance with another aspect of the present invention, a method is provided for transmitting sensor data in a wireless sensor network. The method includes: determining a child node in a collaborative active state, to which sensor data measured by a same sensor from among child nodes having the same sensor will be transmitted, and a child node in a collaborative sleeping state, to which sensor data measured by the same sensor will not be transmitted, from the child nodes having the same sensor by using information on child nodes; and controlling transmission of sensor data measured by the same sensor to each of the child nodes having the same sensor by the determination.

BRIEF DESCRIPTION OF TILE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described with reference to the accompanying drawings. In the following description, a detailed description of known functions and configurations incorporated herein will be omitted when it may make the subject matter of the present invention rather unclear. Further, various specific definitions found in the following description are provided only to help general understanding of the present invention, and it is apparent to those skilled in the art that the present invention can be implemented without such definitions.

The present invention provides various sensing techniques based on an allowed error range of a sensor and a collaborative sensing technique between sensor nodes in order to improve the energy efficiency in a wireless sensor network. Therefore, the following detailed description of the embodiments of the present invention includes a detailed description of a sensing scheme based on an allowed error range of a sensor and a collaborative sensing scheme between sensor nodes.

Figure 1A:
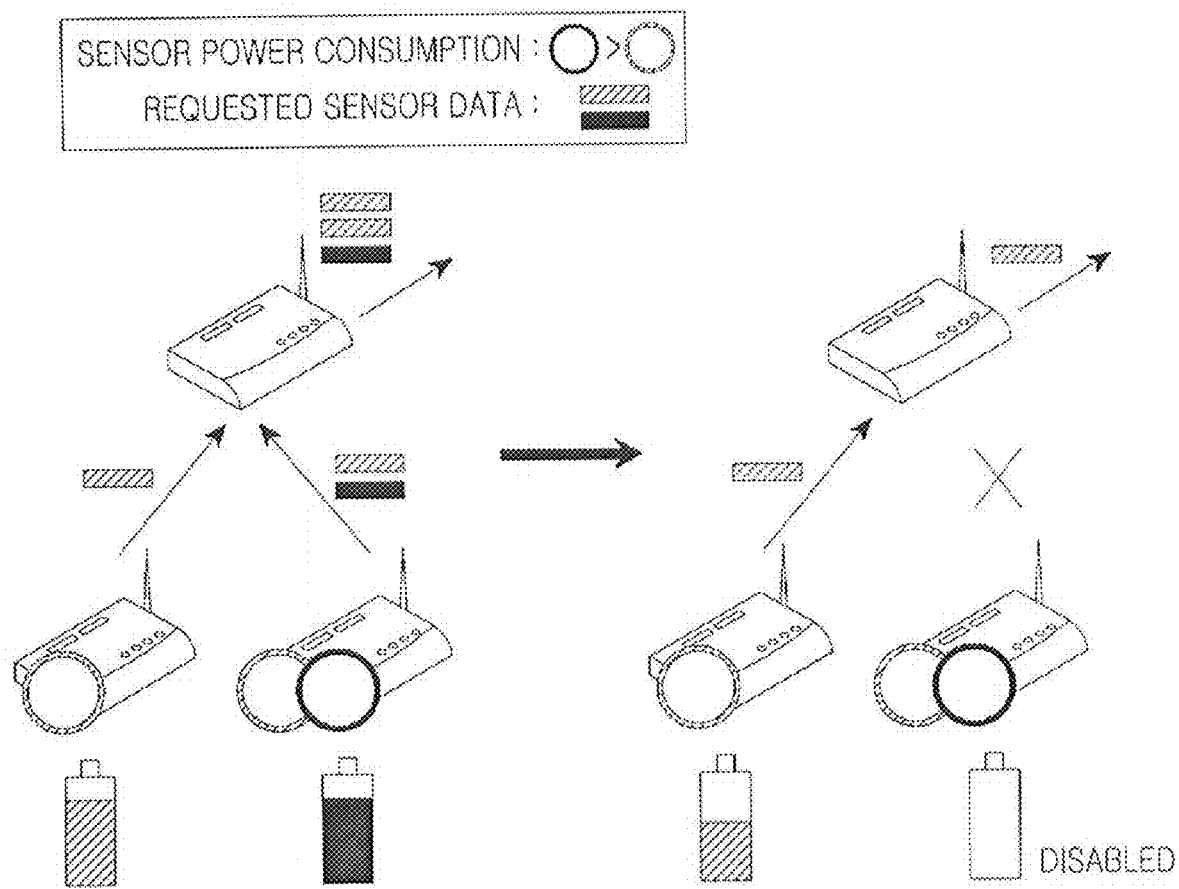
FIG. 1A illustrates a conventional wireless network system transmitting all sensor data.
Figure 1B:
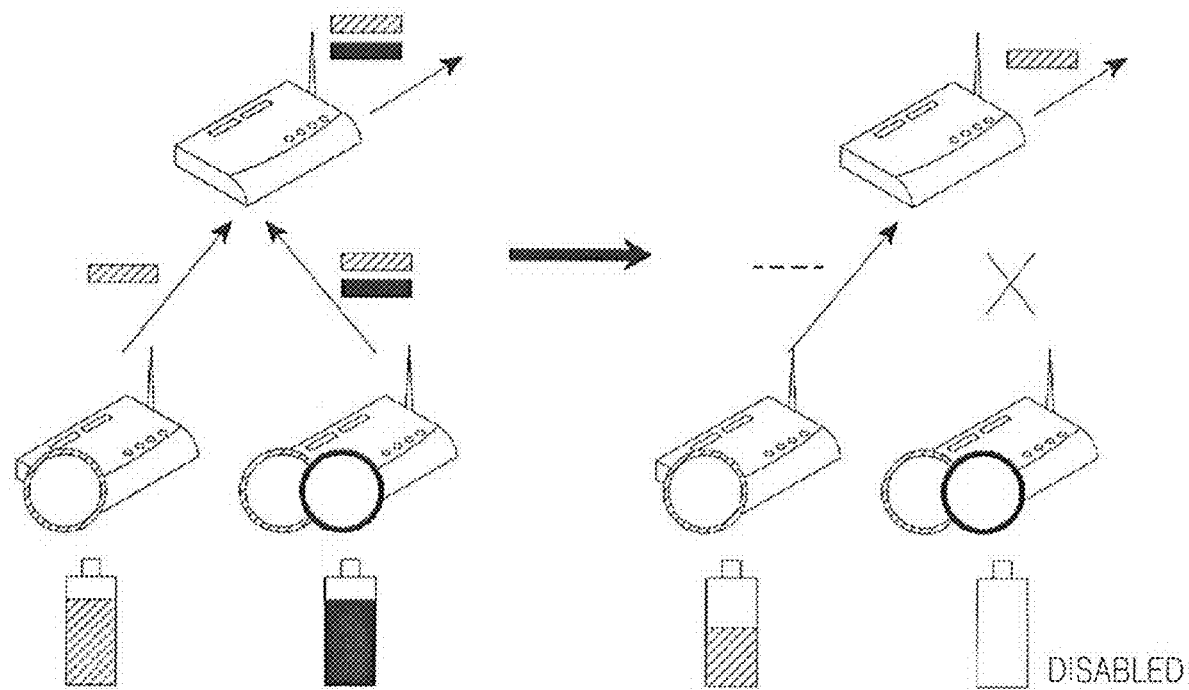
FIG. 1B illustrates a conventional wireless network system that is improved by transmitting sensor data using in-network aggregation.
Figure 2:
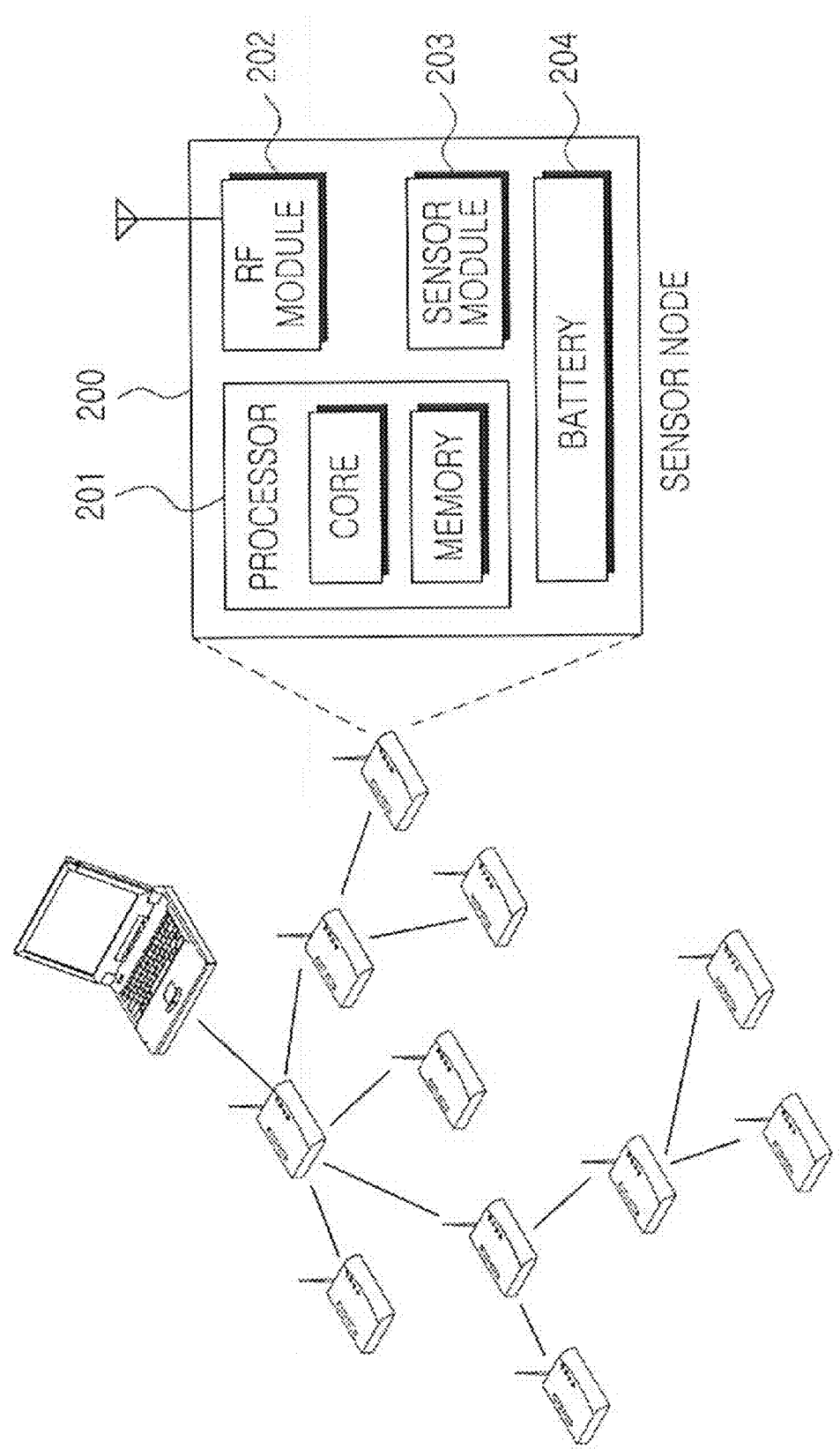
FIG. 2 illustrates construction of a conventional wireless sensor network and a sensor node.

FIG. 2 illustrates a wireless sensor network, to which the present invention is applied, and a sensor node of the wireless sensor network. For wireless connection between nodes, it is possible to apply, for example, a ZigBee network using IEEE 802.15.4, as a physical layer and a Medium Access Control (MAC) layer. Data sensed by a sensor node is finally delivered to a user of the sensor network through a sink node. In general, a sensor node 200 includes a processor device (micro controller unit) 201, a wireless communication device (RF module 202), a sensor module 203, and a battery 204. The sensor module 203 may include a plurality of sensors, and sensor data detected by the sensor module 203 is processed by the processor device, and is then transmitted to a wireless network by the wireless communication device (RF module 202).

In a ubiquitous environment, in order to sense an actual real world environment, sensor nodes must send a large amount of sensor data to a sink node at as fast a sample period as possible. Therefore, the sensor data is transmitted to the sink node via multiple sensor nodes. As a result, the sensor nodes often consume a large quantity of energy in transmitting the sensor data, which then reduces the life of the sensor network. Accordingly, in order to reduce the message communication that consumes the largest quantity of energy, it is possible to transmit properly selected sensor data to the sink node, which can reduce the total energy consumption by the communication.

An allowed error range-based sensing technique can be performed even in a single sensor node of a sensor network equipped with a sensor module. Every sensor installed at each sensor node of a wireless sensor network basically has an allowed error of hardware. Therefore, because the sensors have different capabilities, the sensor data values measured by the sensors may be different for each of the sensors, even when there is no change in the surrounding environment. Here, when the sensor data has been delivered to the sink node and given to a user, the user recognizes the resultant value in implicit consideration of the original allowed error of the sensor.

However, the embodiments of the present invention that will be described below pay attention to the fact that sensor data transmission that is based on the allowed error may increase energy consumption by the message communication in the wireless sensor network. Accordingly, the embodiments of the present invention provide sensing schemes of preemptively applying a user's implicit consideration of the original allowed error to all node levels at which a lowest node or middle node sensing is performed.

Figure 3:
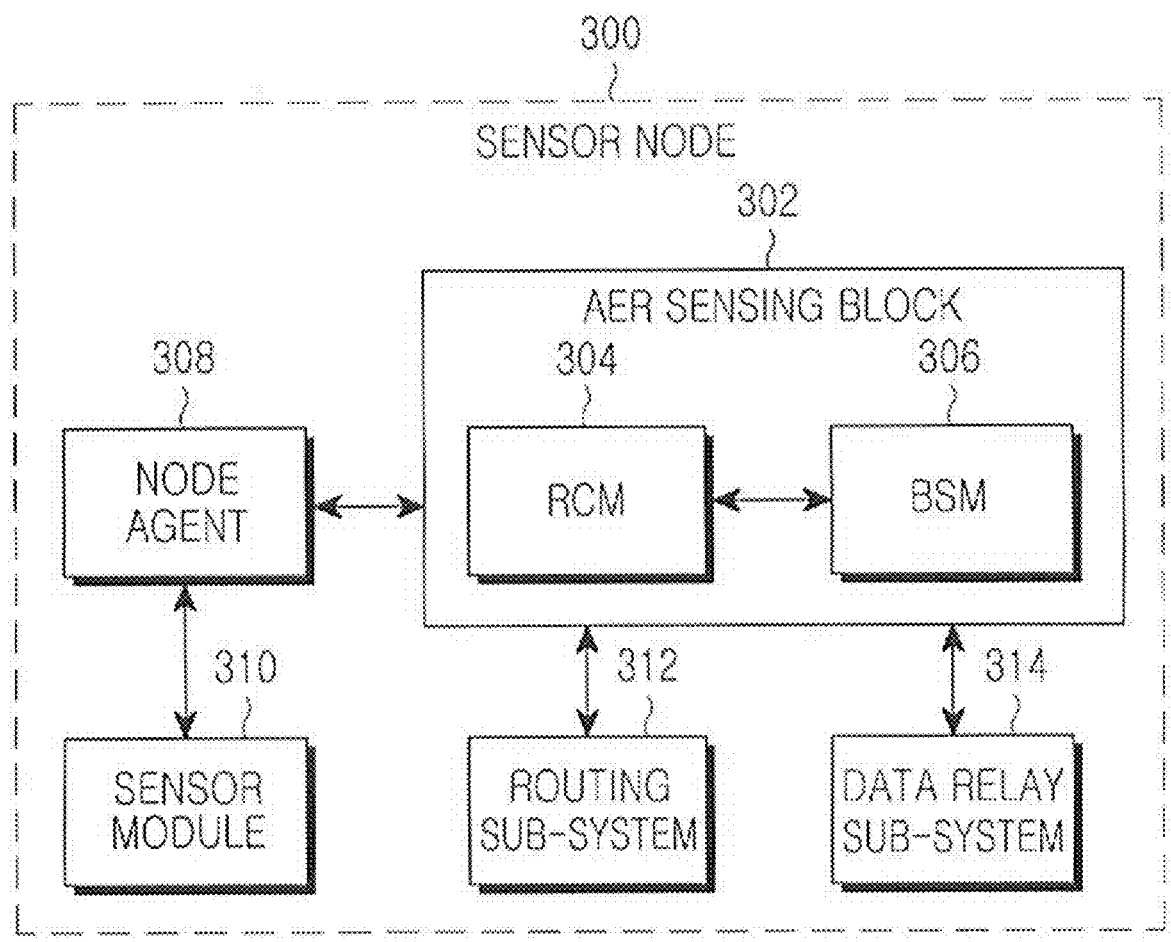
FIG. 3 illustrates an apparatus for allowed error range-based sensing according to an embodiment of the present invention.

FIG. 3 illustrates an apparatus for allowed error range-based sensing according to an embodiment of the present invention.

Referring to FIG. 3, a sensor node 300 includes an Allowed Error Range (AER) sensing block 302, a node agent 308, a sensor module 310, a routing sub-system 312, and a data relay sub-system 314. The AER sensing block 302 includes a Range Calculator Module (RCM) 304 and a Bounded Sensing Module (BSM) 306.

In order to calculate an allowed error rage of a sensor in the sensor node 300, sensor profile information including types of sensors possessed by the sensor node 300 and allowed errors according to the types of sensors is necessary. The allowed error of each sensor refers to the sensor's specific allowed error, which is determined when the sensor has been manufactured, and is usually indicated in a manual or specification of the sensor. Herein, the sensor profile information is previously stored in the sensor module 310.

The sensor module 310 includes at least one sensor and performs sensing at a predetermined sampling period. When the sensor module 310 has transmitted sensor data and sensor profile information to the node agent 308, the node agent 308 transmits the sensor data and the sensor profile information to the AER sensing block 302. Then, the AER sensing block 302 calculates the allowed error rage of the sensor by using the information on the sensor and the sensor data, and the sensor data sensed based on the allowed error range is transmitted to a higher node through the data relay sub-system 314.

The range calculator module 304 may calculate the allowed error range of the sensor using the Normal AER calculation method and a Strict AER calculation method. These methods are determined at the beginning of the system, depending on how much accuracy a user requires and how urgent the result is for the user in a wireless network environment. These calculation methods described above may be either preset in the sensor node or optionally selected by the user in consideration of the object of operation when the sensor node is operated. That is, the range calculator module 304 determines whether to use the Normal AER calculation method or the Strict AER calculation method, based on the initial settings, in calculation of the allowed error range. Thereafter, the range calculator module 304 obtains the allowed error range of the sensor by using at least one piece of sensor data and the sensor's own allowed error provided from the node agent 308.

The Normal AER calculation method and the Strict AER calculation method will be described hereinafter in more detail with reference to FIG. 4.

Figure 4:
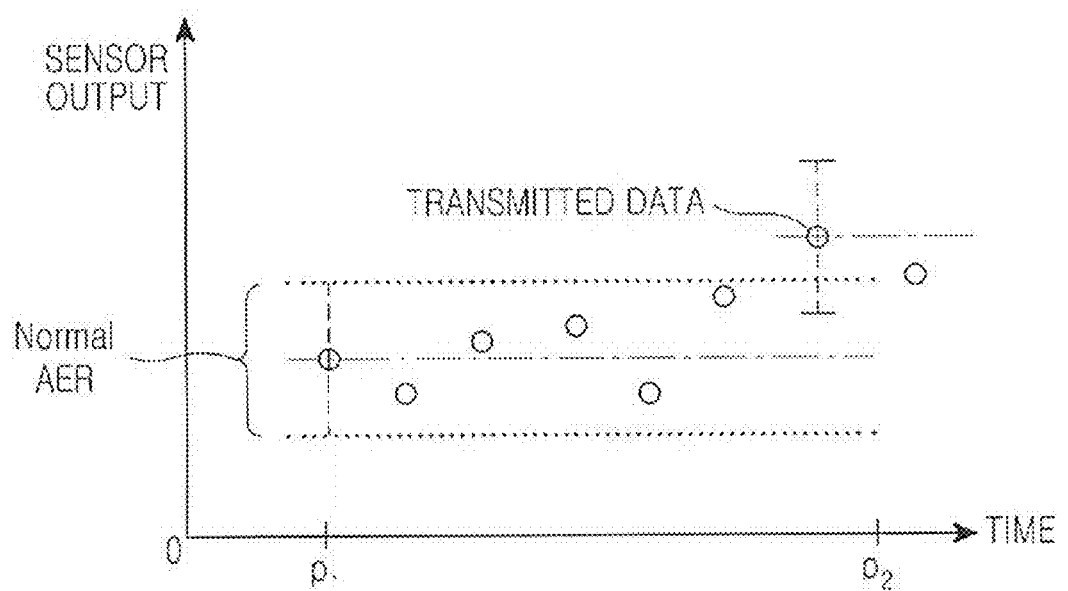
FIG. 4 illustrates Allowed Error Range (AER) sensing in two modes.
Figure 4:
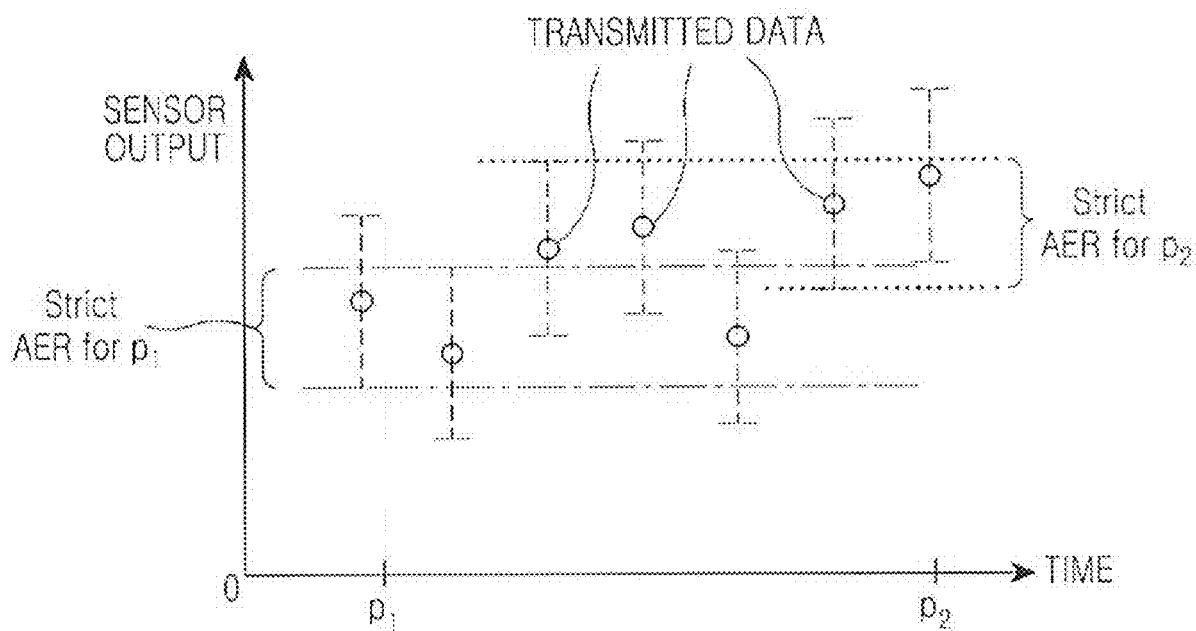

In the Normal AER calculation method illustrated in FIG. 4, at point p1, at which the initial sensor data is received, an upper limit of the allowed error range is determined by adding a sensor's own allowed error to the sensor data value, and a lower limit of the allowed error range is determined by subtracting the allowed error from the sensor data value. Although the initial allowed error range is determined by using one sensor data value in the present embodiment, it is apparent to one skilled in the art that the initial allowed error range can be determined by adding or subtracting to or from an average value of multiple sensor data values. When the Normal AER value has been determined, the AER calculation method and the AER value are provided to the bounded sensing module 306. When an event beyond the allowed error range occurs (that is, when sensor data beyond the allowed error range occurs), the bounded sensing module 306 transmits corresponding sensor data to its parent node (or higher node). When there is transmission of the sensor data, the Normal AER that is based on the allowed error is recalculated into a new value. The Normal AER in a new period is calculated based on the transmitted sensor data value.

The Strict AER calculation method requires at least two sensor data values, in order to determine an allowed error range of an initial sensor. An upper limit of the allowed error range is determined by adding the sensor's own allowed error to the smallest value among multiple sensor data values, and a lower limit of the allowed error range is determined by subtracting the sensor's own allowed error from the largest value among the multiple sensor data values. Through this calculation, the Strict AER, which corresponds to a strict allowed error range reflecting a basic allowed error, is determined. When the Strict AER has been determined, an AER calculation method and an AER value are provided to the bounded sensing module 306. When an event beyond the allowed error range occurs, the bounded sensing module 306 transmits corresponding sensor data to its parent node (or higher node). If the allowed error range does not exist, i.e., when the upper limit is smaller than the lower limit, the bounded sensing module 306 transmits all sensor data to a higher node.

Differently from the Normal AER described above, the allowed error range obtained through the Strict AER calculation method is recalculated for the next period, after passage of a predetermined time period. The new AER in the new period can be obtained using a maximum value and a minimum value among the sensor data values transmitted in the previous period. At this time, a preset number of sensor data values according to the capacity of a used memory are Maintained in a candidate queue, and a maximum value and a minimum value are selected from recent sensor data values.

The range calculator module 304 calculates the average error range according to one of the two methods described above by using the sensor data and sensor's own allowed error provided from the node agent 308. The range calculator module 304 provides the average error range value to the bounded sensing module 306. When sensor data beyond the allowed error range occurs, the bounded sensing module 306 filters the sensor data and transmits the sensor data to a higher node. The transmitted data is stored to be used by the range calculator module 304, such that the data is used as candidate data for calculation of a new allowed error range of a next period.

Because the data to be transmitted is selected on the basis of an allowed error range obtained through a calculation based on the sensor's own allowed error, it is possible to reduce the energy consumption of the communication while maintaining the original characteristic of the sensor data.

If a new sensor data value beyond the allowed error range does not occur during a time period preset in the profile, a sensor data value within the allowed error range is transmitted once again so that a user can know the current state of the sensor node. More specifically, when a sensor data value beyond the allowed error range does not occur during a predetermined time, the bounded sensing module 306 periodically transmits a sensor data value within the allowed error range to a higher node. The sensor data corresponds to data finally sensed during a predetermined time period, and is stored as candidate data used when the AER value is recalculated at a new period. The sensor data is periodically transmitted as described above because even the sensor data value within the allowed error range, which corresponds to a constant and changeless phenomenon, is information that should be transmitted and reported.

The bounded sensing module 306 transmits the filtered or periodically-transmitted sensor data to a higher node through the data relay sub-system 314. By selecting the sensor data based on the allowed error range and transmitting the sensor data to a higher node as described above, the sensor node can reduce the energy consumption.

Figure 5:
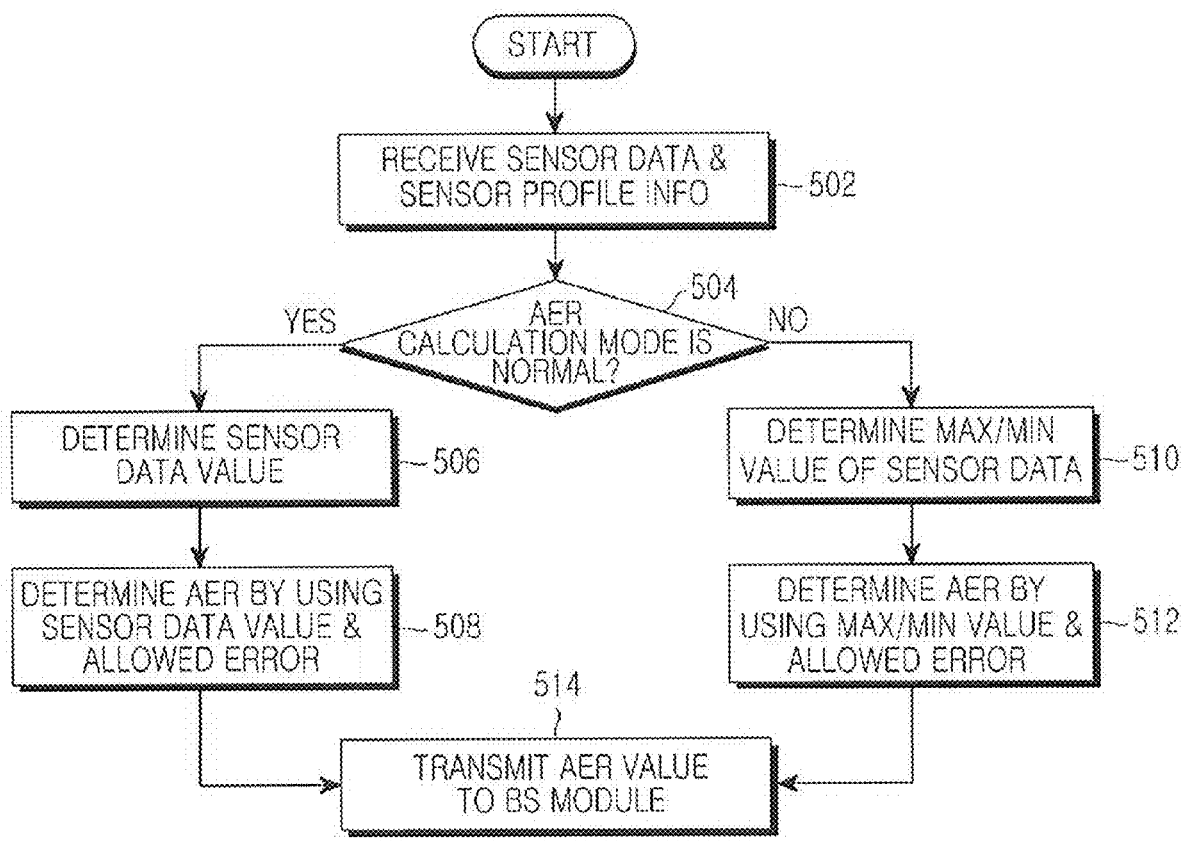
FIG. 5 illustrates an operation of a Range Calculation Module (RCM) according to an embodiment of the present invention.

FIG. 5 illustrates an operation of a Range Calculation Module (RCM) according to an embodiment of the present invention.

Referring to FIG. 5, in step 502, the RCM receives sensor data and profile information from a node agent. In step 504, the RCM determines whether it will perform the calculation in the Normal AER mode or in the Strict AER mode, according to the profile initial setting.

When the RCM determines to perform the calculation in the Normal AER mode, the RCM uses one recent data value to determine the initial allowed error range in step 506. In order to determine the initial allowed error range, the RCM may use either a single sensor data value or multiple sensor data values read from the node agent. When using multiple sensor data values, the RCM determines an allowed error range by using an average value of the multiple sensor data values. After step 506 is completed, the RCM determines the Normal AER by using the single sensor data value or the average sensor data value obtained in step 506 and the sensor's own allowed error value in step 508. Specifically, the determined Normal AER has an upper limit having a value obtained by adding an allowed error to the average value and a lower limit having a value obtained by subtracting the allowed error from the average value. After step 508 is completed, the RCM transmits the AER and AER mode information to the range sensing module in step 514.

When the RCM determines to perform the calculation in the Normal AER mode, the RCM determines a maximum value and a minimum value of at least sensor data values read from the node agent in step 510. In step 512, the RCM determines the allowed error range by using the maximum value/minimum value and the sensor's own allowed error. That is, the RCM obtains an upper limit by adding an allowed error to the minimum value and a lower limit by subtracting the allowed error from the maximum value. After completing step 512, the RCM transmits the AER and AER mode information to the range sensing module in step 514.

Figure 6:
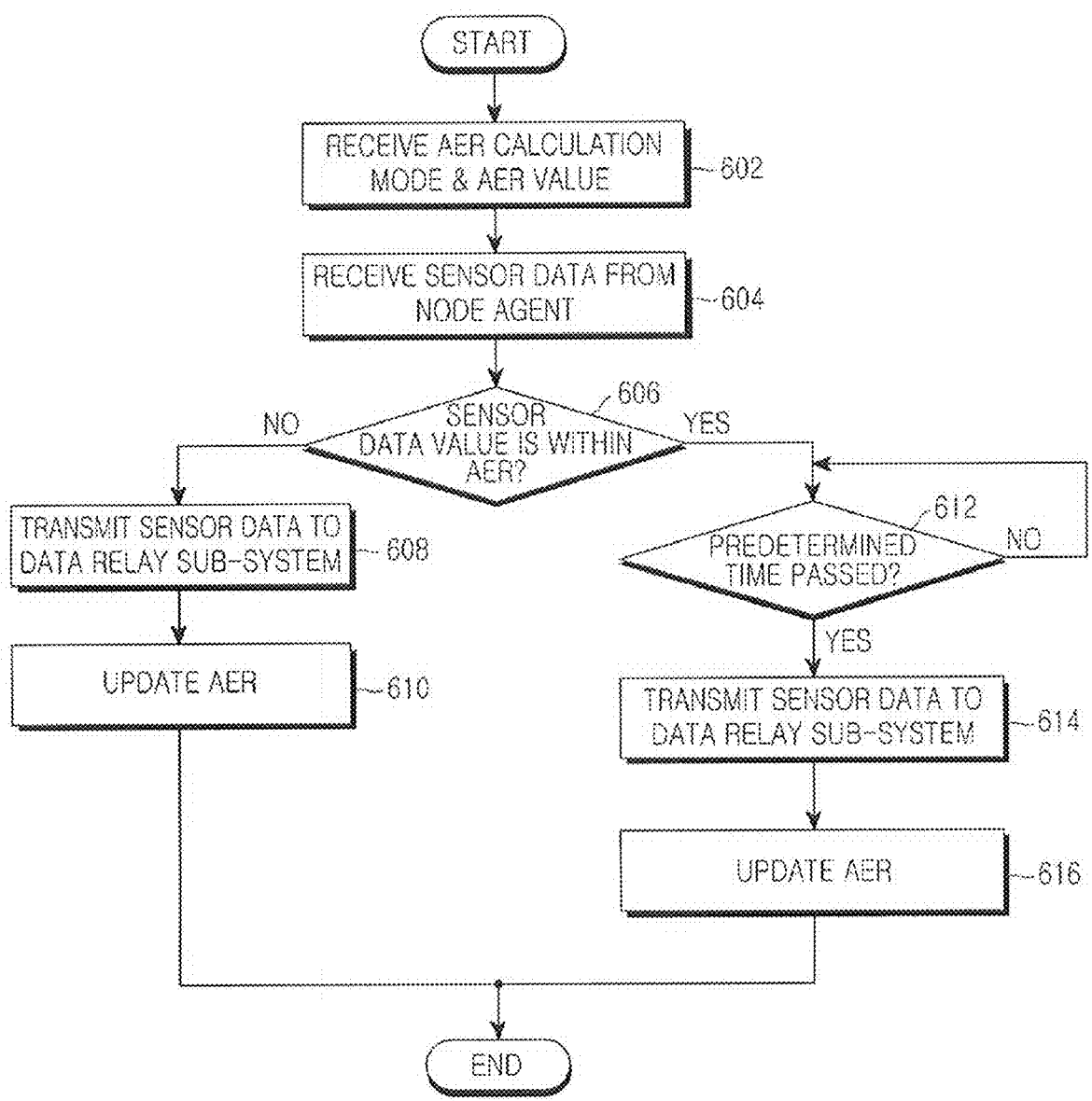
FIG. 6 illustrates an operation of a Bounded Sensing. Module (BSM) according to an embodiment of the present invention.

FIG. 6 illustrates an operation of a Bounded Sensing Module (BSM) according to an embodiment of the present invention.

Referring to FIG. 6, in step 602, the BSM receives an AER and AER mode information from the RCM. In step 604, the BSM reads sensor data values from the node agency, and in step 606, the BSM determines if the read sensor data values are within the AER.

When an event beyond the AER has occurred, the BSM filters the sensor data beyond the AER and transmits the sensor data to the data relay sub-system in step 608. In step 610, the BSM commands the RCM to re-calculate the AER in order to determine a new AER.

When the AER calculation mode is the Normal AER mode, the new AER in the new period is calculated based on the sensor data value transmitted to the higher node. In contrast, when the AER calculation mode is the Strict AER mode, the new AER in the new period is calculated using the maximum value and the minimum value among the sensor data values having been transmitted up to the previous period.

When an event beyond the AER does not occur, in step 612, the BSM periodically transmits the sensor data. When a time preset in the profile has passed, even without the occurrence of new sensor data beyond the AER, the BSM periodically reports the current sensor node state to the user by transmitting the sensor data to the higher node. Accordingly, in step 612, the BSM determines if a predetermined time has passed without the occurrence of the event (in a state where the sensor data value is within the AER). When the predetermined time has passed, the BSM transmits the sensor data to the higher node through the data relay sub-system in step 614. The transmitted sensor data may be data finally sensed during one period.

After step 614, the BSM commands the RCM to re-calculate the AER in order to determine a new AER in step 616.

As described above, the BSM filters sensor data to be transmitted and periodic transmits the sensor data using the AER calculated by the RCM.

Figure 7:
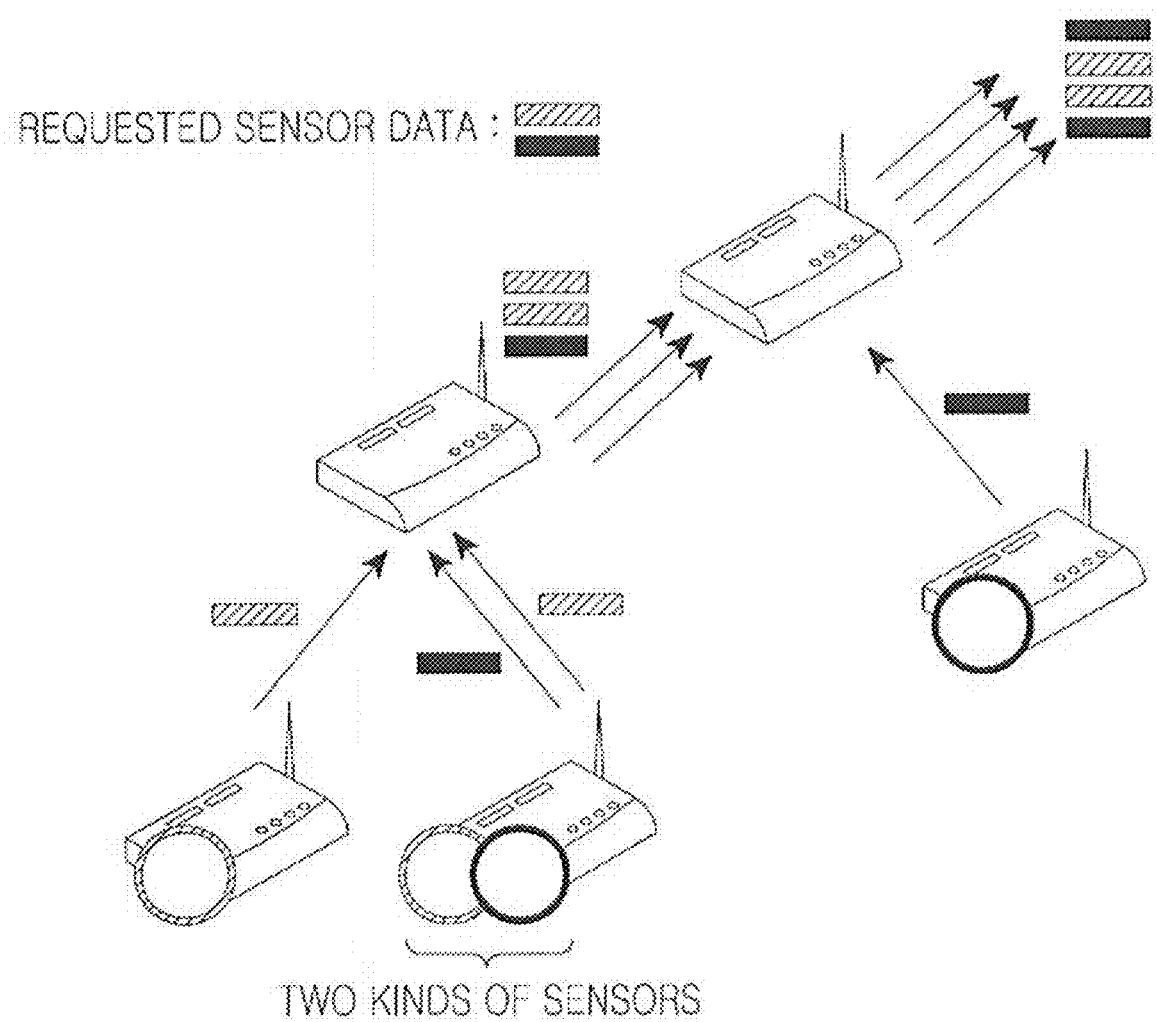
FIG. 7 illustrates a minimum unit for performing collaborative sensing according an embodiment of the present invention.

FIG. 7 illustrates a minimum unit for performing collaborative sensing according an embodiment of the present invention.

Referring to FIG. 7, the collaborative sensing between sensor nodes requires one 1-hop interval parent node and at least two child nodes. This requirement relates to when the child nodes perform sensing and transmit the sensed data to their parent node.

Figure 8:
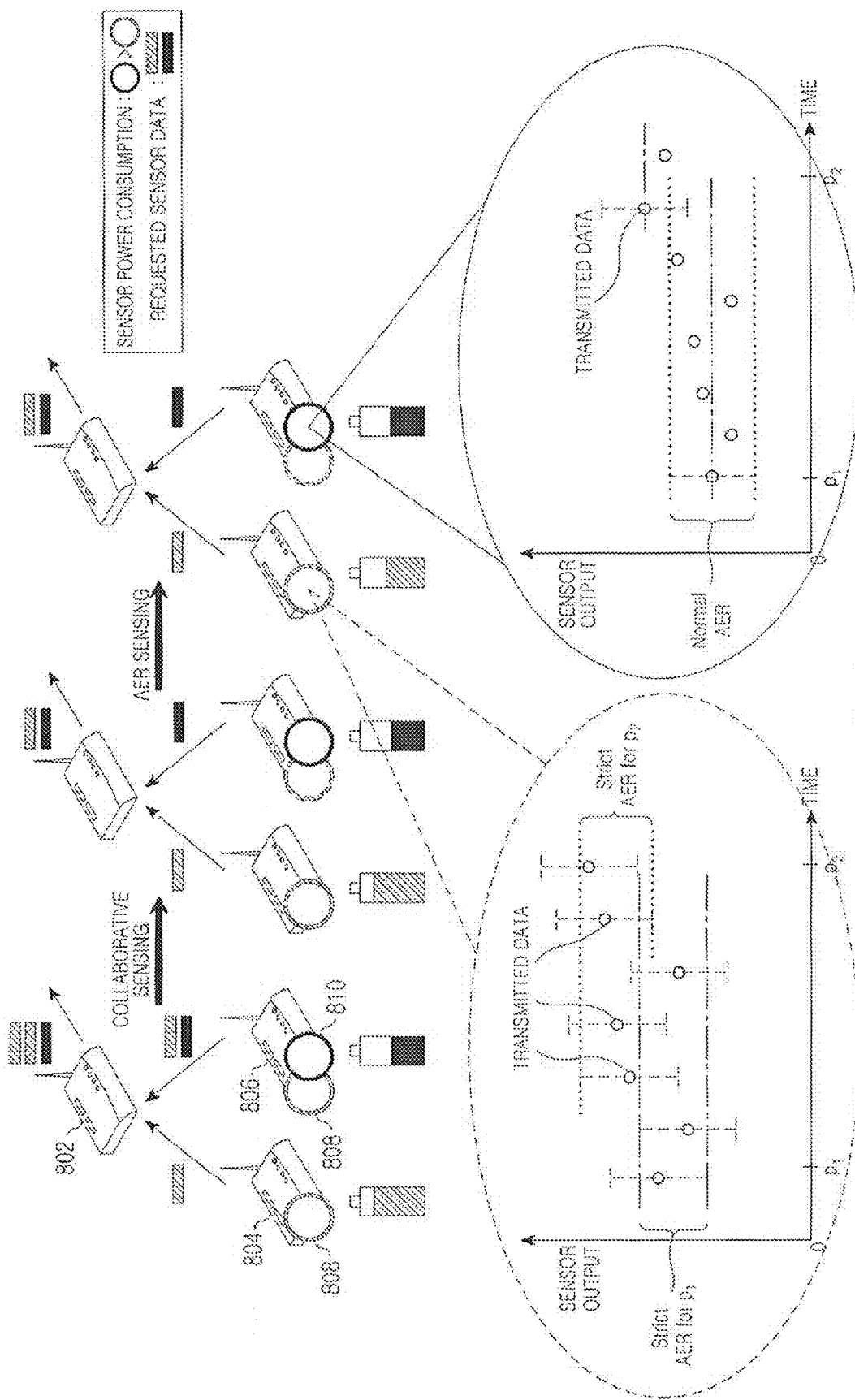
FIG. 8 illustrates a wireless sensor network for performing collaborative sensing according an embodiment of the present invention.

FIG. 8 illustrates a wireless sensor network for performing collaborative sensing according an embodiment of the present invention. Referring to FIG. 8, a sensor node 804 including a sensor 808 and a sensor node 806 including two sensors 808 and 810 transmit sensed data to a higher node. The two sensors have the same type of sensor 808, and the sensor node 804 has a battery with a sufficient power while the sensor node 806 has a battery with a small amount of power. In this situation, the sensor node 806 having a battery with the small amount of power may doubly transmit sensor data equal or similar to that of an adjacent sensor node, which accelerates battery consumption and shortens the life of the network. Therefore, there has been a request for a scheme for solving the energy unbalance between multiple sensor nodes. In order to solve the above-described problem, a collaborative sensing according to an embodiment of the present invention prevents the sensor node 806 from transmitting the same type of sensor data as that of the adjacent node 804, thereby reducing the energy consumption.

According to an embodiment of the present invention, nodes having the same type of sensors can collaborative sensing and nodes having even different types of sensors can use AER sensing, thereby improving the energy efficiency.

Figure 9:
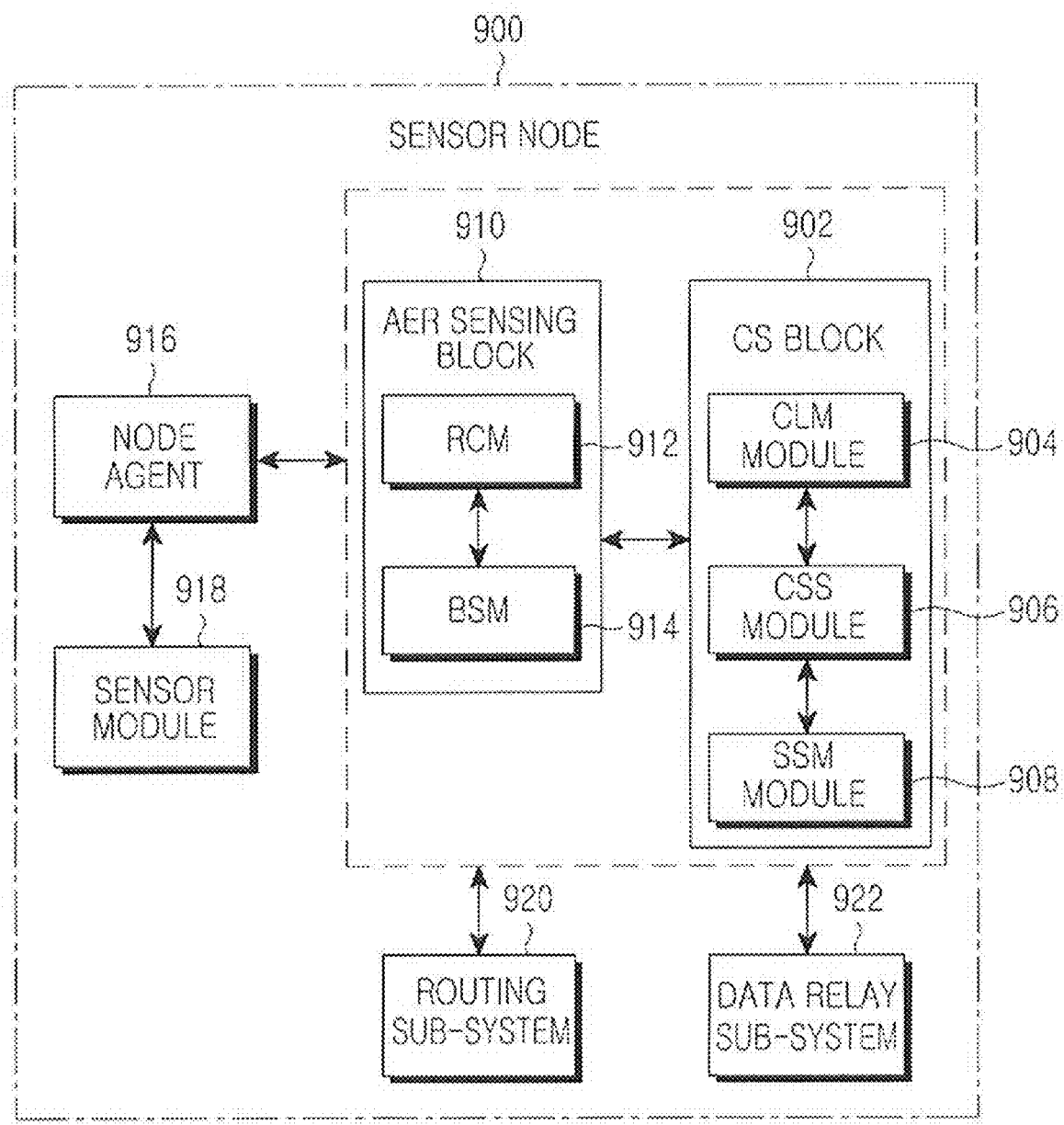
FIG. 9 illustrates an apparatus for collaborative sensing according to an embodiment of the present invention.

FIG. 9 illustrates an apparatus for collaborative sensing according to an embodiment of the present invention.

Referring to FIG. 9, a sensor node 900 includes an AER sensing block 910, a Collaborative Sensing (CS) block 902, a node agent 916, a sensor module 918, a routing sub-system 920, and a data relay sub-system 922. Further, the AER sensing block 910 includes a Range Calculator Module (RCM) 912 and a Bounded Sensing Module (BSM) 914. Additionally, the collaborative sensing block 902 includes a Collaborative List. Manager (CLM) module 904, a Collaborative Sensor Selection (CSS) module 906, and a Sensor State Manager (SSM) module 908.

The collaborative sensing block 902 is a manager for collaborative sensing between nodes and operates when the sensor node 900 is a parent node. One parent node performs communication with 1-hop child nodes, and the collaborative sensing block 902 performs a function for collaborative sensing when the battery state of a child node degrades.

First, the collaborative list manager module 904 requests information on 1-hop child nodes from the routing sub-system 920. In response to the request, the routing sub-system 920 provides the information on the 1-hop child nodes to the parent node.

Upon receiving information on the child nodes managed by the collaborative list manager module 904, the collaborative list manager module 904 receives information for collaborative sensing from the 1-hop child nodes through the data relay sub-system 922.

After analyzing the received information, the collaborative list manager module 904 manages node Identifications (IDs) of the child nodes, sensor ID, sensor data, sensor node state (s_state), sensed time stamp (t_stamp), sensor's own allowed error (s_err), battery state (energy_level), and degree of adjacency between the 1-hop child nodes (nearF) using a table. When there is a change in the information, the collaborative list manager module 904 updates the table for the collaborative list.

When a child node rapidly consuming the battery is checked step-by-step or a child node wakes up from the collaborative sleeping (COLL_SLEEP) state, the collaborative list manager module 904 pages the collaborative sensor selection module 906 in order to find a child node in an active state, which can help the child node with an insufficient battery power. The collaborative sensor selection module 906 searches for a child node capable of giving the help in the collaborative list. In contrast, when a child node with an insufficient battery power is not checked, the collaborative list manager module 904 transmits the sensor data received from the data relay sub-system 922 to its higher node in order to transmit the data to the sink node.

The collaborative sensor selection module 906 selects a sensor node, which will help to the sensor node with an insufficient battery power, from child nodes provided with the same type of sensor module. To this end, the collaborative sensor selection module 906 first checks if it is in a collaborative sleeping state (COLL_SLEEP) because the parent node also may become a child node with respect to its higher node and may be in a collaborative sleeping state when it has an insufficient remaining battery power. That is, the fact that a parent node is in a collaborative sleeping state (COLL_SLEEP) refers to a state in which the parent node is requesting its higher node to help. When the parent node is in a collaborative sleeping state (COLL_SLEEP), the collaborative sensor selection module 906 transmits the sensor data transmitted from a child node to the data relay sub-system 922. When the parent node is not in a collaborative sleeping state (COLL_SLEEP), the collaborative sensor selection module 906 transmits its own sensor data as wells as the sensor data transmitted from a child node to the data relay sub-system 922.

The collaborative sensor selection module 906 checks the nearF information in order to select a child node that will help. The nearF value is a factor indicating the degree of adjacency between the 1-hop child nodes. When there is distance information between child nodes, the nearF value is set to 0 or 1 and is managed by the collaborative list manager module 904. Among the values of 0 and 1, 1 indicates a group of child nodes adjacent to each other, and 0 indicates a group of child nodes far from each other. However, when the distance information does not exist, the nearF value is set to 1 for child nodes that have the same type of sensors and have different sensor values, the difference between which is within an allowed error range of the sensor. Otherwise, the nearF value is set to 0. Because the environment of sensor nodes adjacent to each other does not undergo a big change, it is highly probable that the sensor data values received from the sensor nodes have the same value of similar values.

The collaborative sensor selection module 906 selects the sensor node having a nearF value of 1 as a child node that will help. Therefore, the collaborative sensor selection module 906 improves the energy efficiency and the reliability of sensing by using the nearF value between the child nodes. The nearF information is provided to and managed by the collaborative list manager module 904. When the child node to be helped and the child node that will help have been determined, the collaborative sensor selection module 906 pages the sensor state manager module 908.

By transmitting a control command to child nodes through the data relay sub-system 922, the sensor state manager module 908 switches the helping sensor node into a collaborative active state (COLL_ACTIVE) and the helped sensor node into a collaborative sleeping state (COLL_SLEEP). Even when a sensor node is switched into collaborative active state, the sensor node performs the same jobs as that of a typical sensor node in an active state, except that the sensor node is doing a collaborative job with another sensor node. When a sensor node is in a collaborative sleeping state (COLL_SLEEP), the sensor node does not use an RF module but performs an AER sensing, which corresponds to a scheme for waking up from the collaborative sleeping state. Otherwise, through a time expiration setting, the sensor node may wake up from the collaborative sleeping state. When the state of the child nodes changes, the changed sensor state information (s_state) is provided to and updated by the collaborative list manager module 904.

The sensor node in the collaborative sleeping state (COLL_SLEEP) returns to the active state when the AER sensing senses sensor data beyond the AER or a preset time has passed. The returning by the AER sensing is based on the child nodes performing the collaborative sensing using the AER sensing. Therefore, even when the child node is in the collaborative sleeping state, if an event (sensor data beyond the AER) occurs, the sensor node transmits the sensor data to a parent node. When the state of the helping child node is restored to the original state, the collaborative sleeping state (COLL_SLEEP) shifts to the active state. Therefore, a sensor node having multiple sensors also may avoid using an RF module when it is in the collaborative sleeping state, because the sensor node is performing the AER sensing for all sensors, which enables the sensor node to return to the active state when the event occurs in at least one sensor. When the sensor node in the collaborative sleeping state (COLL_SLEEP) has returned to the active state, the child node transmits the sensor data to the parent node. Upon receiving the transmitted sensor data, the parent node recognizes the returning of the state of the child node. Therefore, the changed state information is provided to and updated by the collaborative list manager module 904.

By the interaction between the collaborative sensing modules as described above, it is possible to realize the collaborative sensing technique between nodes based on the AER sensing.

Figure 10:
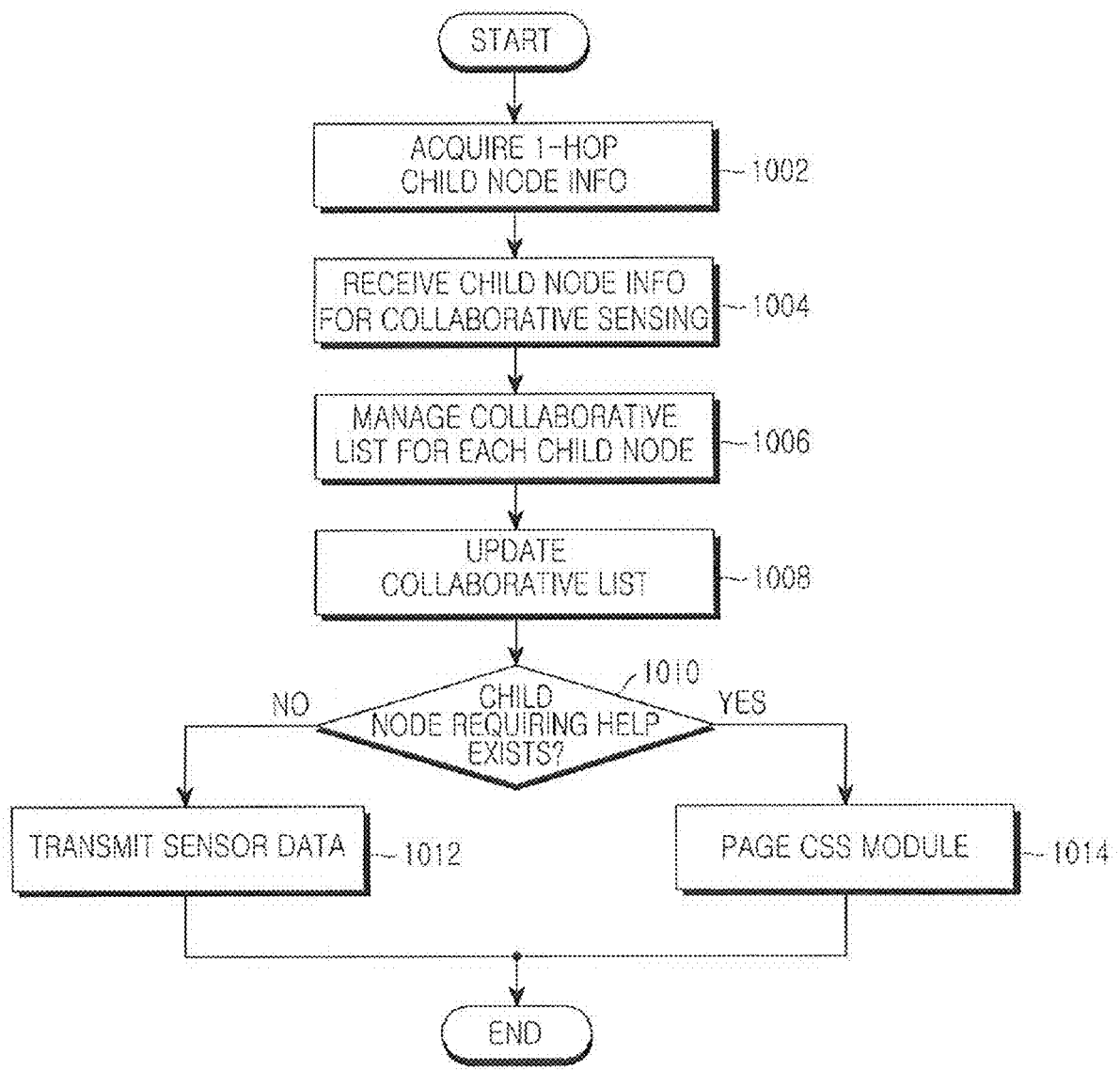
FIG. 10 illustrates an operation of a Collaborative List Management (CLM) module according to an embodiment of the present invention.

FIG. 10 illustrates an operation of the Collaborative List Management (CLM) module according to an embodiment of the present invention.

Referring to FIG. 10, in step 1002, the CLM module acquires information on 1-hop child nodes through communication with a routing sub-system. After acquiring the information on the child nodes, the CLM module receives information relating to the child nodes in order to perform the collaborative sensing in step 1004. In step 1006, based on the received information, the CLM module manages node of the child nodes, sensor ID, sensor data, sensor node state (s_state), sensed time stamp (t_stamp), allowed error of sensor hardware (s_err), battery state (energy_level), and degree of adjacency between 1-hop child nodes (nearF), using a table. In step 1008, when there is any change in the information described above, the CLM module updates the table for the collaborative list.

After step 1008 is completed, the CLM module determines if there is a child node having consumed too much battery power (i.e., a child node requiring help) in step 1010. If there is no child node requiring help, in step 1012, the CLM module transmits the sensor data of child modes, which have been received from the data relay sub-system, to its higher node. If there is a child node requiring help, in step 1014, the CLM module pages the collaborative sensor selection module in order to find a child node that will help the child node having insufficient battery power.

Figure 11:
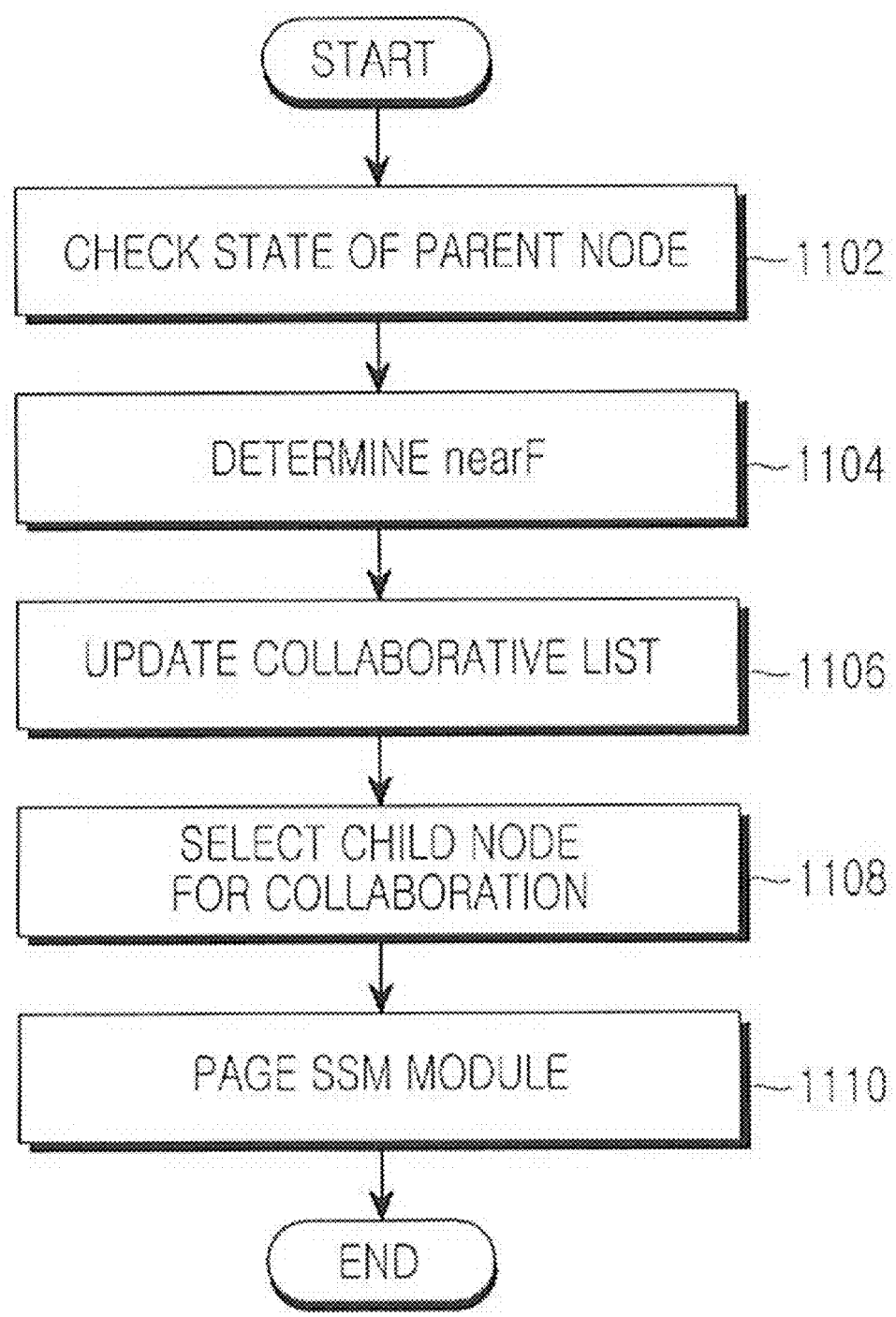
FIG. 11 illustrates an operation of a Collaborative Sensor Selection (CSS) module according to an embodiment of the present invention.

FIG. 11 illustrates an operation of the Collaborative Sensor Selection (CSS) module according to an embodiment of the present invention.

Referring to FIG. 11, the CSS module selects a sensor node, which will help a sensor node having insufficient remaining battery power, from among child nodes having the same sensor. In step 1102, the CSS module checks the state of the parent node. More specifically, the CSS module determines if the parent node is the collaborative sleeping state (COLL_SLEEP). When the parent node is in the collaborative sleeping state (COLL_SLEEP), the CSS module transmits the sensor data of the child node to a higher node through the data relay sub-system. When the parent node is not in the collaborative sleeping state (COLL_SLEEP), the CSS module transmits its own sensor data as well as the sensor data of the child node to the higher node.

After step 1102 is completed, the CSS module determines the nearF value indicating the degree of adjacency between the child nodes in step 1104. Based on sufficient initial sensor data samples, the nearF value is set to 1 for child nodes that have the same type of sensors and have different sensor values, the difference between which is within an allowed error range of the sensor. Otherwise, the nearF value is set to 0.

In step 1106, the nearF value is provided to and updated by the collaborative list manager module.

In step 1108, using the nearF information, the CSS module selects a child node that will help. That is, from the sensor nodes having a nearF value of 1, the CSS module selects a child node that will help. When the child node requiring the help and the child node that will help have been determined, the CSS module pages the sensor state manager module in step 1110.

Figure 12:
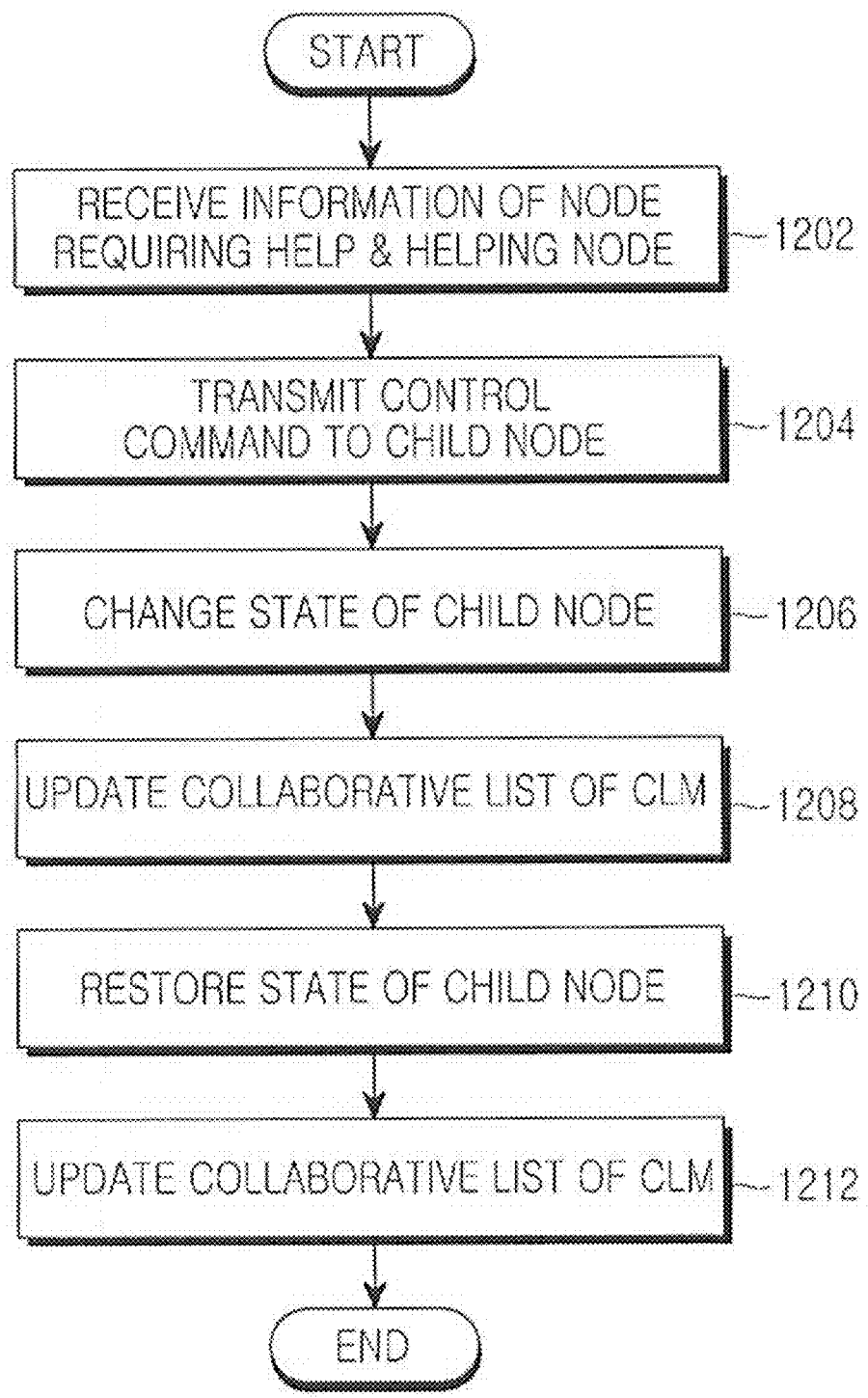
FIG. 12 illustrates an operation of a Sensor State Manager (SSM) module according to an embodiment of the present invention.

FIG. 12 illustrates an operation of the Sensor State Manager (SSM) module according to an embodiment of the present invention.

Referring to FIG. 12, the SSM module receives information on the child node requiring the help and the child node that will help from the CSS module in step 1202. In step 1204, the SSM module transmits a control command to child nodes through the data relay sub-system in order to change the state of the child nodes. In step 1206, using the control command, the helping sensor node shifts into the collaborative active state (COLL_ACTIVE) while the helped sensor node shifts into the collaborative sleeping state (COLL_SLEEP). The sensor node in the collaborative active state transmits the sensor data to the parent node. In contrast, the child node in the collaborative sleeping state does not use the RF module and does not transmit the sensor data. However, even when the child node is the collaborative sleeping state, the AER sensing is performed.

In step 1208, the changed state information (s_state) of the child nodes is provided to and updated by the collaborative list manager module.

The child node in the collaborative sleeping state shills its state into the active state when an event occurs during AER sensing or a predetermined time has passed. When the child node has transmitted the sensor data to the parent node after returning to the active state, the sensor state manager module switches the state of the child node requiring, the help from the collaborative sleeping sate to the active state. Further, the sensor state manager module switches the state of the helping child node from the collaborative active state to the active state.

Through the method as described above, it is possible to implement a collaborative sensing between nodes based on AER sensing.

As described above, the various embodiments of the present invention can efficiently reduce the quantity of data that is transmitted to a higher node by providing AER-based sensing method and apparatus. Also, the embodiments of the present invention can lower the recognition of AER at the user level to the sensing level of the sensor node, which can reduce the energy for transmission of sensor data to the user level, thereby extending the life of the sensor node.

Further, the embodiments of the present invention can increase the application and use of various practical ubiquitous sensor networks in a wireless sensor network including battery-based sensor nodes.

Moreover, the embodiments of the present invention provide a method and an apparatus for collaborative sensing between nodes using AER-based sensing, which makes it possible to economically and efficiently use the entire wireless sensor network.

While the present invention has been shown and described with reference to certain embodiments thereof, various changes in form and details may be made therein without departing from the spirit and scope of the invention as defined by the appended claims. Therefore, the scope of the present invention should be determined by the appended claims and equivalents thereof.

For example, the above description of the embodiments of the present invention uses examples of realization of the collaborative sensing technique between nodes using the AER sensing and an AER-based sensing technique in a wireless sensor network. However, the present invention is also applicable to similar technological backgrounds and wireless communication systems without largely departing from the scope of the invention, and such application will be understood by those skilled in the art.

What is claimed is:

1. A sensor node of a wireless sensor network, the sensor node comprising:
a sensor module including at least one sensor, the sensor module outputting sensor data measured by said at least one sensor; and
an Allowed Error Range (AER) sensing block for calculating an AER for each of said at least one sensor using sensor data measured from said at least one sensor and sensor profile information corresponding to said at least one sensor, and for determining sensor data to be transmitted to a higher node from among sensor data provided by the sensor module, based on the AER.

2. The sensor node of claim 1, wherein the AER sensing block comprises:
    a Range Calculator Module (RCM) for calculating the AER for each of said at least one sensor using the sensor data provided from the sensor module and the sensor profile information corresponding to said at least one sensor; and
    a bounded sensing module for determining the sensor data to be transmitted to the higher node from among the sensor data provided by the sensor module, based on the AER.

3. The sensor node of claim 1, wherein the AER sensing block determines an upper limit of the AER by adding sensor data measured by a predetermined sensor from among said at least one sensor to a specific allowed error within sensor profile information corresponding to the predetermined sensor, and determines a lower limit of the AER by subtracting the specific allowed error from the sensor data measured by the predetermined sensor.

4. The sensor node of claim 1, wherein the AER sensing block determines an upper limit of the AER by adding a minimum value of multiple sensor data values measured by a predetermined sensor from among said at least one sensor to a specific allowed error within sensor profile information corresponding to the predetermined sensor, and determines a lower limit of the AER by subtracting the specific allowed error from a maximum value of the multiple sensor data values measured by the predetermined sensor.

5. The sensor node of claim 1, wherein the AER sensing block determines sensor data beyond the AER from among the sensor data measured by said at least one sensor as the sensor data to be transmitted to the higher node, and determines predetermined sensor data among the sensor data measured by said at least one sensor during a preset time period, when sensor data beyond the AER does not exist during the preset time period.

6. The sensor node of claim 5, wherein the AER sensing block re-calculates the AER using the determined sensor data.

7. A method of transmitting sensor data by a sensor node including a sensor module having at least one sensor and an Allowed Error Range (AER) sensing block, in a wireless sensor network, the method comprising:
    calculating, by the AER sensing block, an AER for each of said at least one sensor by using sensor data measured from said at least one sensor and sensor profile information corresponding to said at least one sensor; and
    determining sensor data to be transmitted to a higher node from among sensor data provided by the sensor module based on the AER.

8. The method of claim 7, wherein calculating the AER comprises:
    calculating an upper limit of the AER by adding sensor data measured by a predetermined sensor from among said at least one sensor to a specific allowed error within sensor profile information corresponding to the predetermined sensor; and
    calculating a lower limit of the AER by subtracting the specific allowed error from the sensor data measured by the predetermined sensor.

9. The method of claim 7, wherein calculating the AER comprises:
    Calculating an upper limit of the AER by adding a minimum value of multiple sensor data values measured by a predetermined sensor from among said at least one sensor to a specific allowed error within sensor profile information corresponding to the predetermined sensor; and
    calculating a lower limit of the AER by subtracting the specific allowed error from a maximum value of the multiple sensor data values measured by the predetermined sensor.

10. The method of claim 7, further comprising:
    determining, by the AER sensing block, sensor data beyond the AER from among the sensor data measured by said at least one sensor as the sensor data to be transmitted to the higher node; and
    determining predetermined sensor data among the sensor data measured by said at least one sensor during a preset time period, when sensor data beyond the AER does not exist during the preset time period.

11. The method of claim 10, further comprising re-calculating the AER using the determined sensor data.

12. A sensor network comprising:
    multiple child nodes, each of the multiple child nodes including at least one sensor and transmitting sensor data measured by said at least one sensor; and
    a parent node for receiving the sensor data transmitted from the multiple child nodes, for managing information on the multiple child nodes, for determining a child node in a collaborative active state, to which sensor data measured by a same sensor from among child nodes having the same sensor will be transmitted, for determining a child node in a collaborative sleeping state, to which the sensor data measured by the same sensor will not be transmitted, from child nodes having the same sensor by using the information on the multiple child nodes, and for controlling transmission of the sensor data measured by the same sensor to each of the determined child nodes.

13. The sensor network of claim 12, wherein the multiple child nodes are in a relation of 1-hop to the parent node.

14. The sensor network of claim 12, wherein the parent node comprises:
    a collaborative list manager module for receiving the information on the multiple child nodes, managing a collaborative list for each of the child nodes, and determining if there is a child node requiring help;
    a collaborative sensor selection module for selecting a child node that will help the child node that needs help, based on the collaborative list; and
    a sensor state manager module for changing state information of the child node requiring help and the child node that will help, and providing the changed state information of the child nodes to the collaborative list manager module.

15. The sensor network of claim 14, wherein the collaborative list comprises one of:
    a node IDentification (ID);
    a sensor ID;
    sensor data;
    a sensor node state (s_state);
    a sensed time stamp (t_stamp);
    a sensor's own allowed error (s_err);
    a battery state (energy_level); and
    a degree of adjacency between 1-hop child nodes (nearF).

16. The sensor network of claim 15, wherein the collaborative sensor selection module selects the child node that will help, by using the degree of the adjacency between the 1-hop child nodes (nearF).

17. The sensor network of claim 12, wherein the child node in the collaborative active state transmits sensor data beyond a predetermined AER from among the sensor data measured by the same sensor to the parent node or transmits the sensor data measured by the same sensor to the parent node when a preset time has passed.

18. The sensor network of claim 17, wherein the child node in the collaborative active state calculates the predetermined AER by using sensor profile information corresponding to the same sensor and sensor data measured by the same sensor.

19. The sensor network of claim 12, wherein, when sensor data is received from the child node in the collaborative sleeping state, the parent node updates a sensor node state corresponding to the child node having transmitted the sensor data to an active state in the information on the multiple child nodes.

20. A method of transmitting sensor data in a wireless sensor network including multiple child nodes and a parent node, the method comprising:
   determining, by the parent node, a child node in a collaborative active state, to which sensor data measured by a same sensor from among child nodes having a same sensor will be transmitted, and a child node in a collaborative sleeping state, to which sensor data measured by the same sensor will not be transmitted, from the child nodes having the same sensor by using information on the child nodes; and
   controlling transmission of sensor data measured by the same sensor to each of the child nodes having the same sensor based on the determining.

21. The method of claim 20, further comprising receiving the information on the child nodes from a plurality of child nodes that are in a relation of 1-hop.

22. The method of claim 20, further comprising receiving, from the child node in the collaborative active state, sensor data beyond a predetermined AER from among sensor data measured by the same sensor or the sensor data measured by the same sensor, when a preset time has passed.

23. The method of claim 22, wherein the predetermined AER is calculated using sensor profile information corresponding to the same sensor and the sensor data measured by the same sensor.

24. The method of claim 20, further comprising, when sensor data is received from the child node in the collaborative sleeping state, updating a sensor node state corresponding to the child node having transmitted the sensor data to an active state in the information on the multiple child nodes.

\* \* \* \* \*